(No Model.) 3 Sheets—Sheet 1.

J. L. HEALD.
Grain Thrasher and Separator.

No. 242,639. Patented June 7, 1881.

Witnesses
Frank A. Brooks
H. F. Dexter

Inventor
John L. Heald
By Dewey & Co
Attys (No Model.) 3 Sheets—Sheet 3.

J. L. HEALD.
Grain Thrasher and Separator.

No. 242,639. Patented June 7, 1881.

Witnesses:
F. L. Middleton
D. H. Mead

Inventor:
John L. Heald
By Dewey & Co. Atty.
Ellis Spear
Associate.

UNITED STATES PATENT OFFICE.

JOHN L. HEALD, OF VALLEJO, CALIFORNIA.

GRAIN THRASHER AND SEPARATOR.

SPECIFICATION forming part of Letters Patent No. 242,639, dated June 7, 1881.

Application filed May 24, 1880. (No model.)

*To all whom it may concern:*

Be it known that I, JOHN L. HEALD, of Vallejo, county of Solano, and State of California, have invented an Improved Grain Thrashing and Separating Machine; and I hereby declare the following to be a full, clear, and exact description thereof.

My invention relates to certain improvements in that class of machines in which the thrashing and separation of grain are performed as a continuous operation; and it consists in such a combination of beaters, pickers, carrying-belts, sieves, chutes, and fans that I am enabled by their use to produce a very perfect separation of the grain from the masses of straw with which it leaves the thrashing-cylinder, and to thoroughly clean the grain from chaff, barley, mustard, or other foreign substances and impurities, so that it is delivered as first-class grain by the single continuous operation and without the use of any supplemental machine or fanning-mill, such as are usually hauled around with the separator, my object being to combine the whole in one machine.

Figure 1:
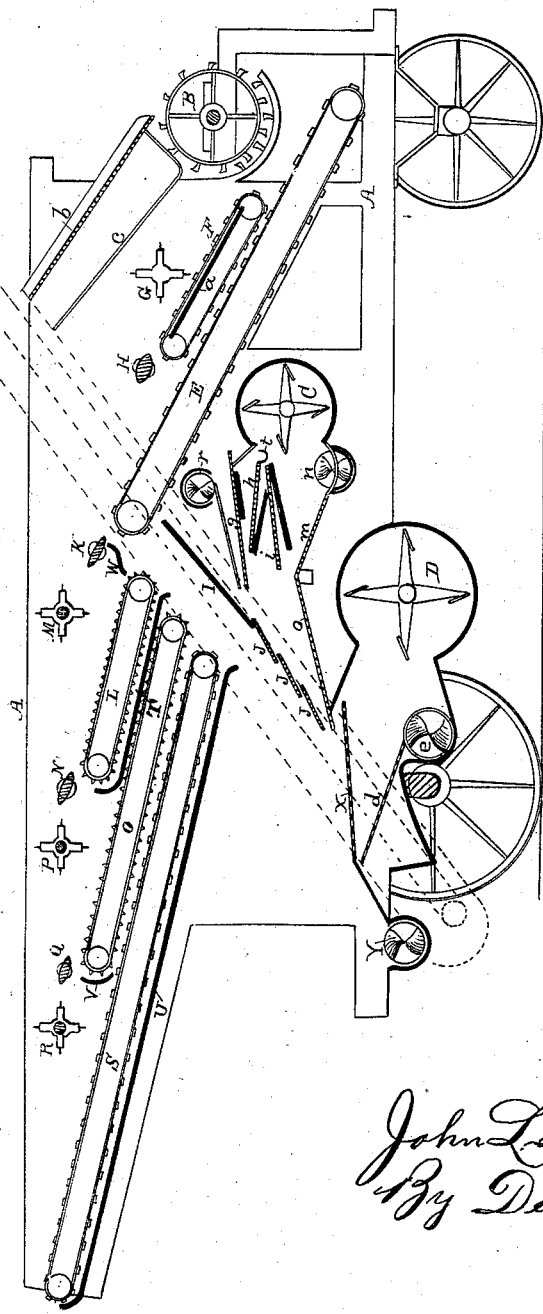
Figure 2:
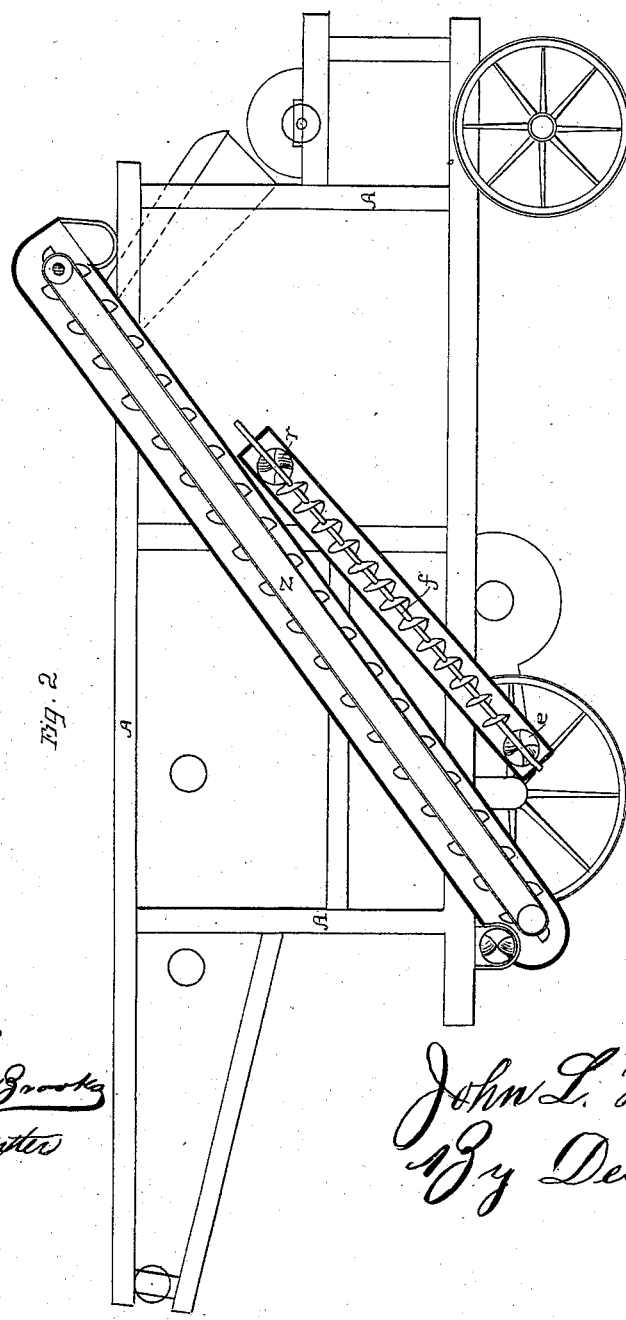
Figure 3:
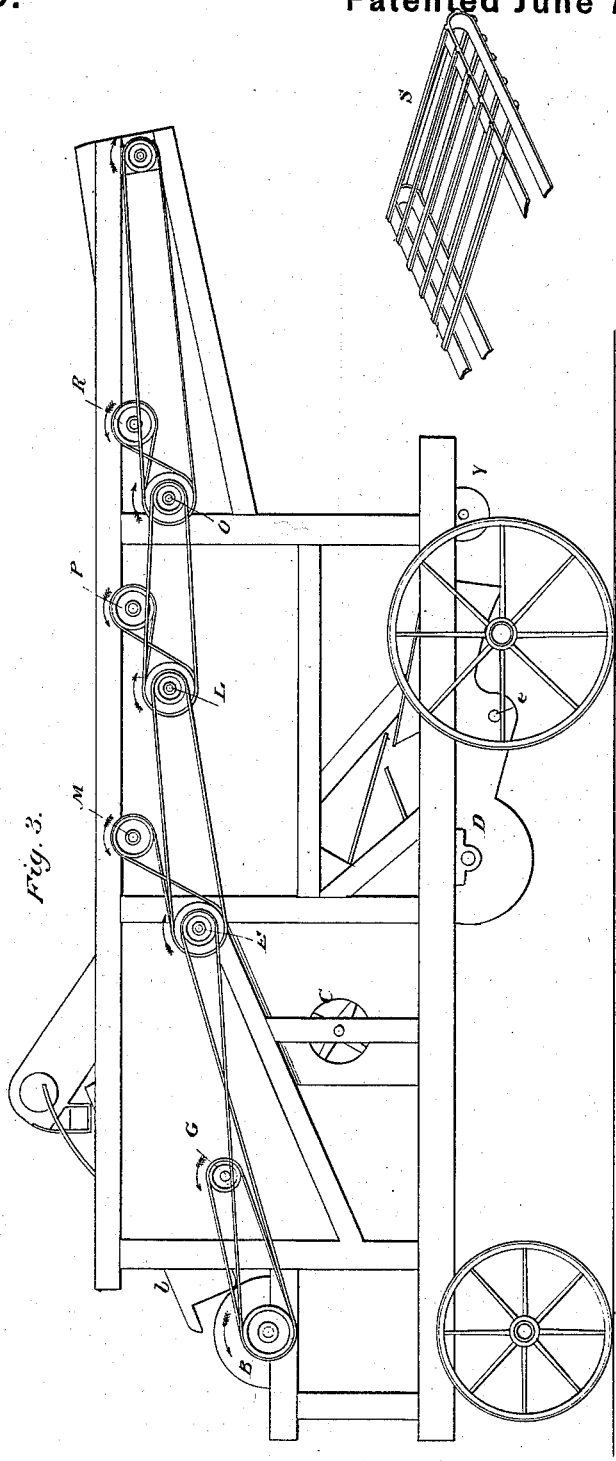

Referring to the accompanying drawings for a more complete explanation of my invention, Figure 1 is a longitudinal vertical section taken through the machine. Fig. 2 is a side elevation, showing the screw-elevator. Fig. 3 is an elevation of the opposite side of the machine, exhibiting the gearing by which motion is given to the straw carriers and beaters.

A is the frame of my machine, which is made in the usual form of thrashing-machines, but somewhat lower.

B is the thrashing-cylinder, and C D are the fans which produce a blast by which the grain is cleaned. These fans are set low, the one at D being placed below the frame, so that the grain in passing over the screens may have considerable fall without being elevated too high after leaving the cylinder.

E is the grain-carrying belt, which receives the straw and grain as they are delivered from the thrashing-cylinder. This carrier is usually worn out very rapidly by reason of the force with which the material strikes it as it leaves the cylinder; and in order to protect it from this wear I have placed a short supplemental open belt, F, just above the carrier E, and at a point where it will receive the straw from the cylinder. This belt carries the straw loosely above the grain-carrier E, and a board, *a*, beneath the upper part of the belt and lined with sheet iron, receives the grain from the cylinder and prevents it being thrown forcibly upon the grain-carrier E. The separation of the grain from the straw upon this belt is assisted by the aid of the beater G, which rotates just above the open belt F, and at a higher speed, and by its action separates and loosens the straw. Just beyond the open belt F is a picker, H, which acts to lift the straw with a tremulous jarring motion, so as to separate the grain from the straw and allow it to fall upon the grain-carrier E.

As machines are usually constructed the straw and grain are received from the cylinder upon a long carrier, and are carried to its upper end before any attempt at separation is made. The great point to be accomplished is to separate the grain from the straw, so that it will settle down upon the grain-carrier, after which the straw and grain may pass up the belt together without detriment, because the grain, being separated from the straw, will not be carried on and out of the machine by it. This separation is the desideratum, and should be accomplished as soon as possible after the material leaves the cylinder.

In my apparatus the grain-carrier E is made short, and all the grain which has settled upon it by means of the devices above described will pass over its upper end and fall upon the chute or return-board I, by which it is directed upon the primary or main screens J.

At a point just beyond the grain-carrier E, I place a picker, K, whose action lifts the straw and passes it upon the carrier L. This carrier moves at a greater rate of speed than the carrier E, and is provided with a beater, M, while at its upper end is still another picker, N. A third carrier, O, receives the straw from the carrier L and passes it beneath another beater, P, and it is delivered by the picker Q beneath the beater R, which throws it downward upon the straw-carrier S, by which the straw is finally discharged over the tail-board of the machine.

By employing a number of short grain-carriers, each of which receives the material from the previous one, I provide a series of drops, in which the grain and straw are struck down by the beaters, and the superior weight of the grain will throw it down upon the grain-carriers below the straw, after which its further separation is comparatively easy. Each series of carriers, beaters, and pickers run faster than those preceding them, the rate of speed being progressive, and the straw is thus pulled apart and separated, so that the grain may pass more easily through it to the carriers.

A return-board, T, lies beneath the carrier L, and any grain which settles upon this carrier will be carried backward upon it and delivered upon the chute I and sieves J. Another return-board, U, beneath the straw-carrier receives the grain which is delivered from the grain-carrier O, and which may fall through the open slats of the straw-carrier, thus delivering all the grain upon the sieves J. A directing-board, V, at the end of the carrier O, prevents the grain upon this carrier from being thrown over upon the straw which is passing off on the straw-carrier, and a board, W, between the carriers E and L, prevents the straw from working down through the space between them.

The blast of air for the sieves J is furnished by the fan C, and these screens are placed at so great an angle that the grain in passing over them is cleansed of its chaff as if it were falling through a blast of air. As the chaff leaves the screens J it encounters another blast of air from the fan D, and is by it thrown off over the tail-board without any chance to clog any of the sieves, while the two fans divide the labor of cleaning. Some of the grain falls through the sieves J upon the screens O, passing thence to the sieve X, while the remainder passes directly to it over the top of the sieves J. My main object is to so divide the work that it will be impossible to clog the machine, however heavy the work. The unthrashed heads and some grain will pass off over the screen X into the elevator-auger Y, from which the elevator Z carries this material up and delivers it upon a screen, b, above the cylinder. The unthrashed heads will be again passed from this screen to the cylinder, while any grain which may have been brought up will pass through into a chute, c, and will be delivered by it upon the grain-carrier E, thus separating the grain from the unthrashed portion, and preventing it from passing through the cylinder to be cracked and broken. The grain which passes through the sieve X falls upon the screen d, and is by it directed to the auger e, which carries it to a screw elevator, f. This elevates the grain to a transverse horizontal screw, which works in a slotted auger-box, r, and the grain is distributed from this slot upon the screens g h i, from which it finally falls upon the inclined screen m, and is delivered to the sacking-auger n in a clean condition. The conveyer t carries off the barley from the screen h. Any grain which will not pass through the lower screen, i, is by it delivered upon the screen o, and thence upon the sieve X and to the elevator-auger Y. Any fine seeds, such as mustard, which may pass through the screens o m will fall upon the closed top of the fan-box D, and may be removed therefrom from time to time.

By this construction I am enabled to separate the grain from the straw in an efficient manner, and to thoroughly clean it by means of the combined doubled apparatus formed in one machine, so as to act in a continuous manner.

By placing the fans so low I am enabled to drop the grain from the highest point of the grain-carrier E, a distance of nearly five feet, before reaching the sieve X, which is about three times the fall that can be obtained in the ordinary form of thrashing-machine or separator.

My combination of apparatus, by which I accomplish a double cleaning in one continuous operation, is most important in the fact that it enables me to thoroughly clean and grade the wheat before sacking it, without the necessity of hauling a second separator around with the thrashing-machine. The expense and labor are thus very much lessened.

Having thus described my invention, what I claim as new, and desire to secure by Letters Patent, is—

1. In a thrashing-machine and grain-separator, the grain-belt E, adapted to receive and convey the straw and grain from the cylinder, in combination with the supplemental open belt F and the belt-protecting board a, substantially as and for the purpose herein described.

2. The series of short grain-belts E, L, and O, each belt moving at a greater speed than the preceding one and adapted to receive the straw from it while the grain is delivered over the ends of the belts upon the return-boards I T U, in combination with the series of beaters and pickers G H K M N, each moving at a higher speed than the preceding one, the whole combined to separate the grain from the straw, substantially as herein described.

3. The series of steeply-inclined sieves J and the screen X, in combination with the fans C and D, whereby the grain is subjected to successive blasts of air and the chaff is carried out without being allowed to settle upon the sieves or screens and clog them, substantially as herein described.

4. The sieves J, screens X d, auger e, elevator f, and slotted distributer r, in combination with the supplemental screens g h i and the two fans C D, whereby a double cleaning is accomplished in one apparatus and with a single continuous operation, substantially as herein described.

In witness whereof I have hereunto set my hand.

JOHN L. HEALD.

Witnesses:
S. H. NOURSE,
FRANK A. BROOKS.